United States Patent

Yen

[11] Patent Number: 5,375,554
[45] Date of Patent: Dec. 27, 1994

[54] ROCKING ROAD EMERGENCY WARNING SIGN

[76] Inventor: Tai C. Yen, 7F-1, No. 74, Jeou Chyuan Street, Taipei, Taiwan, Prov. of China

[21] Appl. No.: 132,932
[22] Filed: Oct. 7, 1993
[51] Int. Cl.$^5$ ............................. E01F 9/01; B60Q 7/00
[52] U.S. Cl. .................................. 116/63 C; 116/63 P
[58] Field of Search ................ 116/63 P, 63 C, 209; 40/600, 602, 608, 612; 404/10, 11

[56] References Cited

U.S. PATENT DOCUMENTS

| | | | |
|---|---|---|---|
| 4,006,702 | 2/1977 | St. Cyr | 116/63 P |
| 4,197,807 | 4/1980 | Campbell | 116/63 P |
| 4,256,050 | 3/1981 | Barnard | 116/63 C |
| 4,995,186 | 2/1991 | Collie | 40/600 X |
| 5,305,705 | 4/1994 | Gagliano | 116/63 P |

FOREIGN PATENT DOCUMENTS

| | | | |
|---|---|---|---|
| 0400175 | 8/1924 | Germany | 116/63 C |
| 0603348 | 3/1960 | Italy | 116/63 P |
| 1441922 | 7/1976 | United Kingdom | 116/63 P |

*Primary Examiner*—William A. Cuchlinski, Jr.
*Assistant Examiner*—Willie Morris Worth
*Attorney, Agent, or Firm*—Lowe, Price, LeBlanc & Becker

[57] ABSTRACT

A rocking road emergency warning sign which is simple of construction and practical of use comprises a main body, a base, a top cover and a warning sign in which said main body is a spiral-shaped body formed by a resilient thin metal plate, said spiral-shaped body can be uncoiled into a triangular cone shape, the top portion of which has holes for attaching the warning sign. In addition, reflective papers or paints can be applied to both sides of the thin metal plate for intensifying the warning effect when the main body is swaying in the wind. The base is a substantially flat plate having a magnet on its bottom for sticking onto the metal part of the car. Also, clipping device are available at the cover to latch the top cover with the base together for carrying and storing.

3 Claims, 4 Drawing Sheets

ROCKING ROAD EMERGENCY WARNING SIGN

BACKGROUND OF THE INVENTION

1. Field of the Invention

The present invention relates to an road emergency warning sign, particularly to a rocking emergency road sign that is handy to carry along and easy to store away.

2. Description of the Prior Art

There are many types of road emergency warning sign available nowadays. These emergency warning signs are generally classified into two categories: one of these is the cone-shaped body with orange reflective color, as shown in FIG. 5. The other one is the triangular-shaped road emergency warning sign, as shown in FIG. 6. Both of these two types of emergency warning road signs have their drawbacks: they are not easy to be carried around, hard to be stored away, poor visibility and the triangular-shaped body is breakable. These drawbacks are caused by the poor design of the physical shape. The cone-shaped warning sign is substantially sturdy as compare to the triangular sign, but it is also bulky and it cannot be disassembled for storage, as is shown in FIG. 5. The triangular road warning sign as shown in FIG. 6 is more fragile because of its edge connection. These two kinds of road warning signs are of the fixed shape and fixed height design, they are impractical to be used in bad weather and poor visibility situation.

In accordance with the invention, the Inventor overcomes the above and other drawbacks by providing a rocking road emergency warning sign which is practical of structure and has the following features:

1. The main body of the road warning sign according to the present invention is a spiral body formed by a thin resilient plate. The spiral body is curled into triangular cone shape in which a warning sign can be affixed to the top. Therefore, it swings freely and slowly in an outside environment so as to alert the drivers passing by.

2. The front and the back of the thin resilient plate can be attached with reflective paper or painted with gloss and reflective paint. The front and the back of the body can also be painted with different colors to get more reflection.

3. The overall resilient body can be pressed to fit into the base and a cover can be used to cover up the whole assembly. This makes it easy to store away and handy to carry around.

4. The bottom of the base has a magnet for the emergency warning sign to stick on the roof or anywhere else of the car. It is designed to be securely mounted and can withstand a high wind speed.

5. The triangular cone-shaped warning sign has a definite height and is visible in any direction. The visibility is not limited to one direction.

6. The warning sign is kept in the base with a cover for storage. It is not easy to get damaged.

7. The warning sign can be used by an individual or for road construction.

SUMMARY OF THE INVENTION

The main object according to the present invention is to provide a rocking road emergency warning sign such that it swings freely and slowly in the roadway so as to intensify the warning effects of the emergency sign.

Another object according to the present invention is to provide a rocking road emergency warning sign such that its main body can be coiled from top to bottom into a flat disk for storage.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
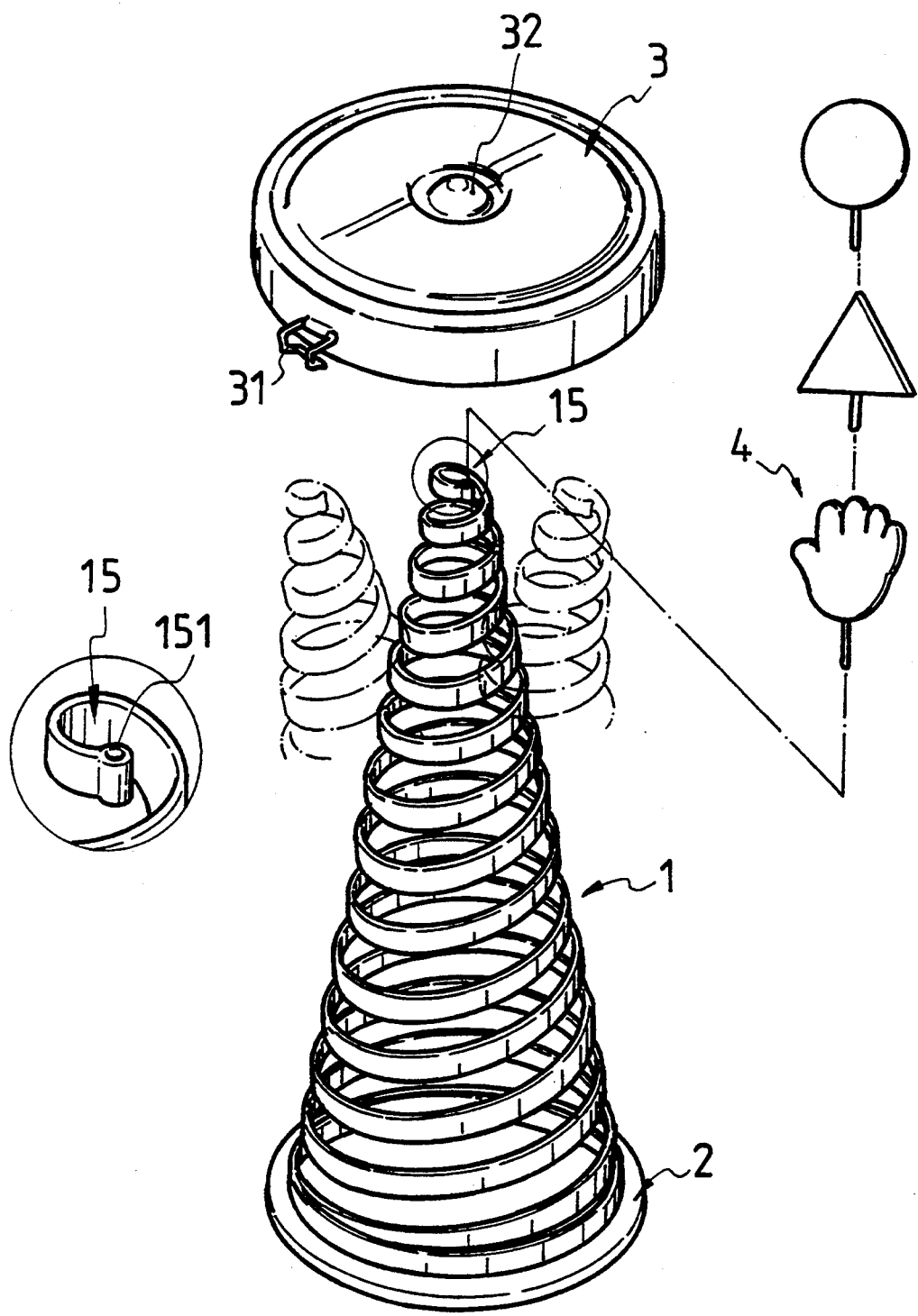
FIG. 1 is a perspective view of the road emergency warning sign according to the present invention.
Figure 3:
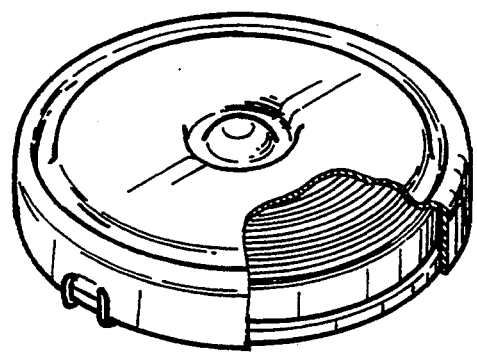
FIG. 3 shows a preferred embodiment of the emergency warning sign in a storage condition according to the present invention.

Referring to FIG. 1, the emergency warning sign according to the present invention consists of a main body 1, a base 2, a top cover 3 and a warning sign 4. The main body 1 is a spiral shape coil formed by a resilient plate. This spiral-shaped body can be pressed and coiled up for storage, as is shown in FIG. 3. When the top cover 3 is removed and the spiral-shaped body is free to be released, it recoils and bounces up to form a triangular cone-shaped body. In the early stage of recoiling, the resilient plate body 1 sways upward slowly so as not to accidently cause an injury or scare a new user away. This is a safety feature. When the main body 1 is completely recoiled, it sways slowly with the wind or air flow. As shown in FIG. 1, the upper portion 15 of the main body 1 has a hole 151 for the attachment of different types of warning signs 4, giving a dynamic warning effects in the roadway. This is especially true when the visibility is poor and the weather is bad. The coiling of the main body 1 gives an elongated warning sign which is taller than a conventional road warning sign, hence, the visibility range is also wider. The warning sign 4 attached to the top of the body 1 can be of various shapes, it can either be triangular, circular, hand shape or any other shapes for putting a slogan. No matter what the shape of the warning sign 4 is, it is coated with a reflective material for caution and warning.

Figure 2:
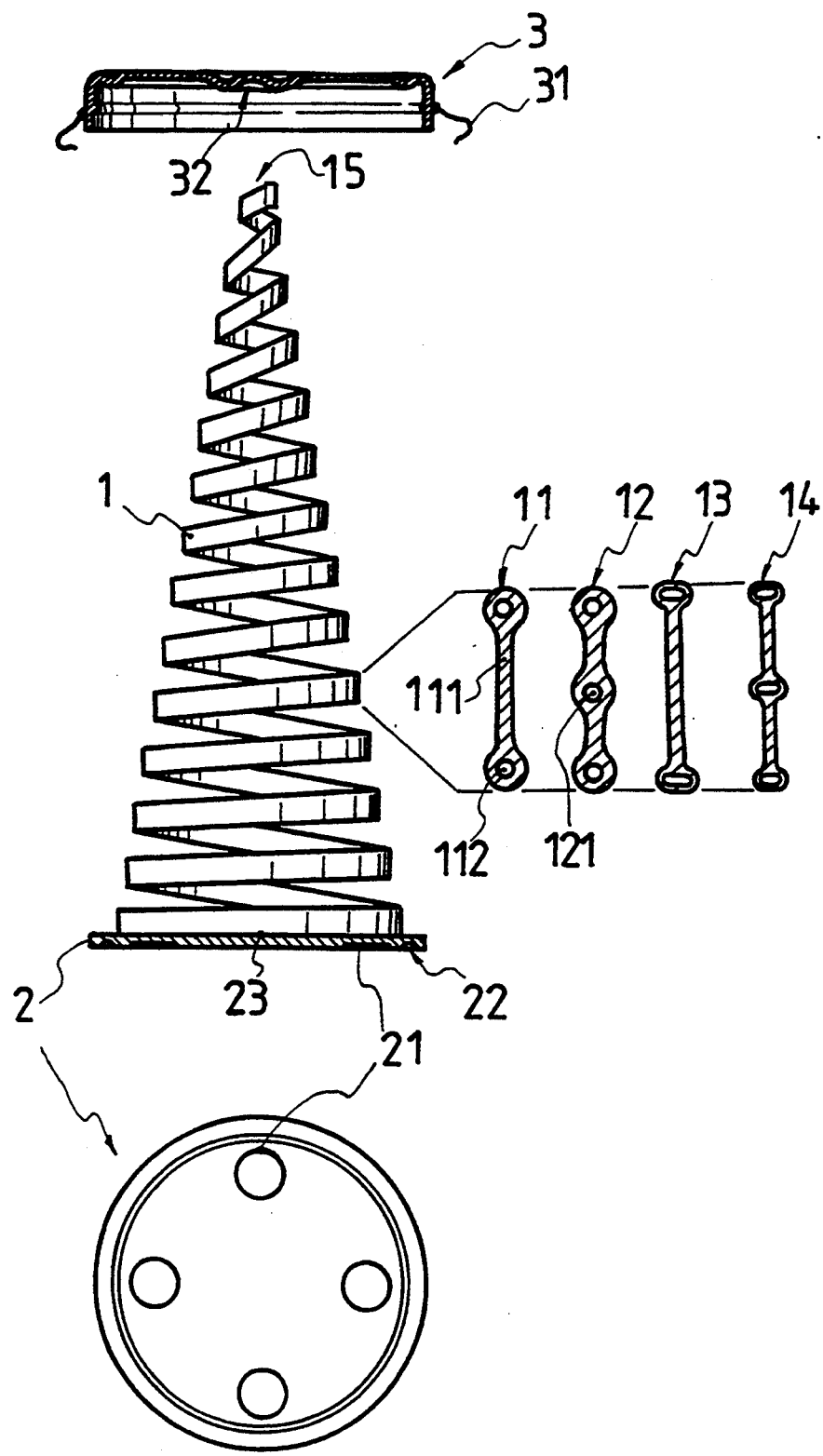
FIG. 2 is a plane view of the emergency warning sign according to the present invention.

In order to enhance the safety and toughness of the structure of the main body 1, the thin plate used to form the main body 1 can be fabricated into other shapes such as the shapes 11 and 13 as shown in FIG. 2. The main body 1 is generally fabricated from resilient metal 112 wrapped up with elastic polystyrene 111 to form the I-shaped cross section. To further strengthen this I-shaped cross section, a resilient metal member 121 is added at its center, as is shown in 12 and 14 of FIG. 2. By this configuration, the deformation due to the coiling of the thin plate for a long period of time is eliminated and the strength of the thin plate is enhanced. However, this configuration will not affect the overall function of the main body 1. In addition, reflective papers or paints can be applied to the inside and outside of the main body 1 to intensify the warning effects.

Figure 4:
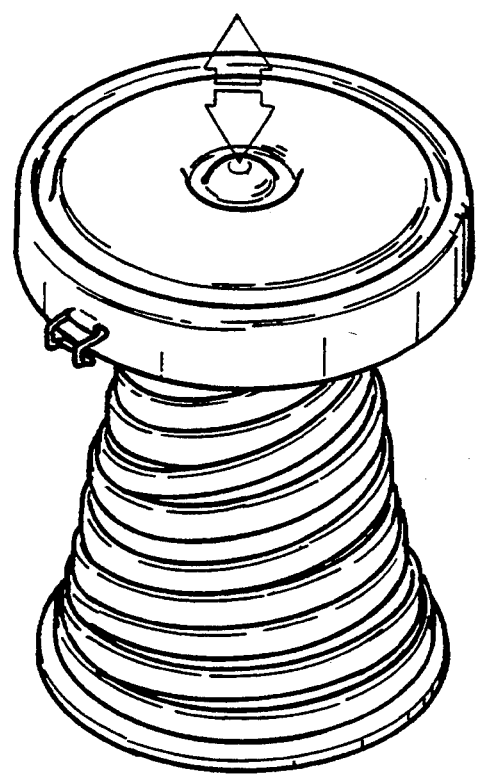
FIG. 4 shows a preferred embodiment of the emergency warning sign according to the present invention.
Figure 5:
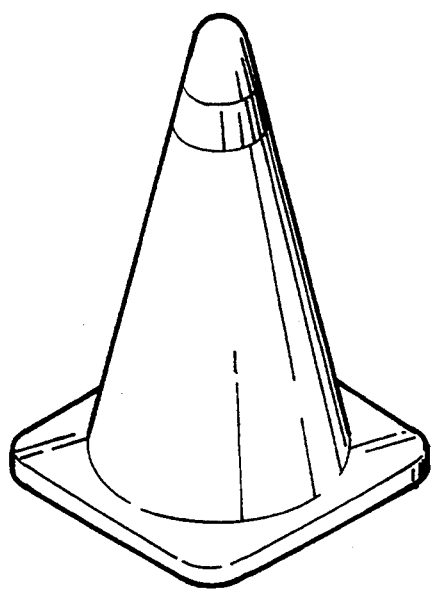
FIG. 5 shows one type of conventional road warning sign.
Figure 6:
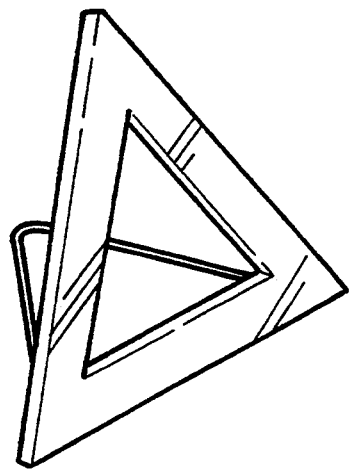
FIG. 6 shows another type of conventional road warning sign.

The base 2 is and its corresponding top cover 3 are mainly designed for storing the main body 1. The base 2 is a substantially flat plate having an interface surface 23 with the main body 1. The main body 1 is attached to the interface surface 23 by gluing. The bottom of the base 2 has a magnet 21 for attaching to the metal roof or body of the automobile. The top cover 3, together with said base 2, forms a container for storing the main body 1. Its edge is of appropriate thickness such that it can cover up the main body 1. The outer edge of the cover 3 has two clips 31 opposite to each other for clipping onto their corresponding rings 22 on the base 2. The clips 31 is latched onto the rings 22 for securing the resilient main body 1 in place and prevent it from uncoiling. At the center of the top cover 3 is a concave portion 32 which is used to align the upper portion 15 of the main body 1 and hold the upper portion 15 therein. Therefore, the main body 1 will not drift and slide while being kept in storage. As shown in FIG. 4, the edge of the top cover 3 has a definite thickness and the base is constructed to be substantially flat. This is because the inventor has considered the fact that the base 2 is usually set on the car roof or laid on the ground. Since the base 2 is exposed when the assembly is in use, it can possible get bent or pressed by other object. In that case, the shape of the base 2 will not deform drastically and the top cover 3 will still be able to cover up the base 2.

The foregoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A car mounted or free standing rocking road emergency warning sign comprising a main body, a base and a top cover therefore said main body being a resilient thin metal ribbon wrapped with elastic polystyrene, so as to form an I-shaped in cross-section spiral-shaped body, said spiral-shaped body being normally coiled from top to bottom into a disk shape, and when the coiling pressure is released, said main body uncoils and bounces upward to form a cone shape that is triangular in cross-section; means for securing a lower portion of the uncoiled main body to said base, said base and said top cover covering said main body when said body is coiled, a bottom surface of said base having a magnet therein for attaching said sign to a metal part of a car, the top cover having a clipping device for locking the top cover to the base for carrying and storage.

2. A rocking road emergency warning sign as recited in claim 1 wherein said spiral-shaped body further includes reinforcing means centrally located along the length thereof and reflective papers and paints are applied to the sides of said spiral-shaped body to intensify the warning effect of the emergency road sign.

3. A rocking road emergency warning sign as recited in claim 1 wherein an upper portion of said spiral-shaped body has a hole provided therein for attachment of warning signs thereto.

* * * * *